Oct. 13, 1964  H. BURMEISTER  3,153,135
PROTECTIVE EYE-SHIELD WITH AN AUTOMATICALLY
CONTROLLED VISOR SLIT
Filed Nov. 30, 1961
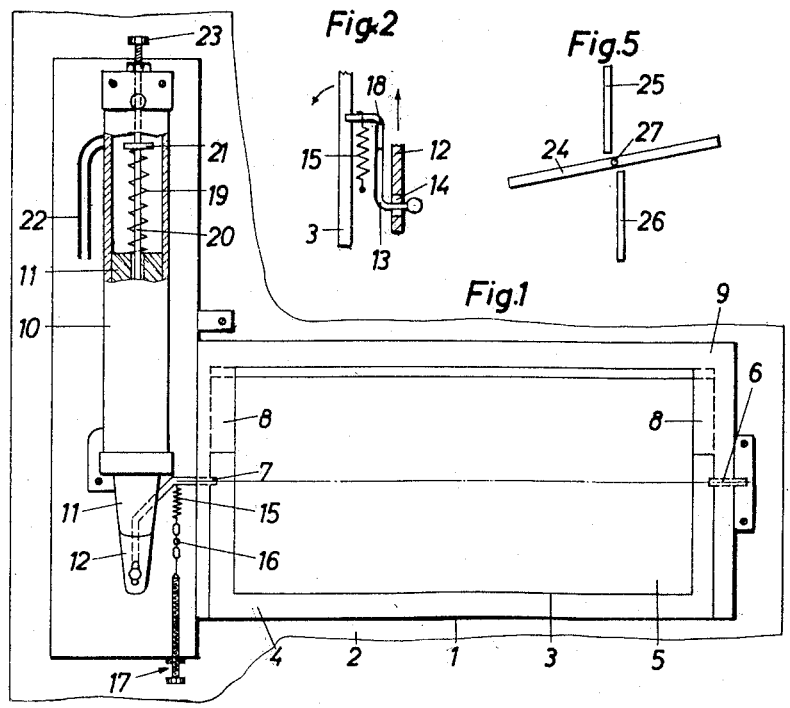
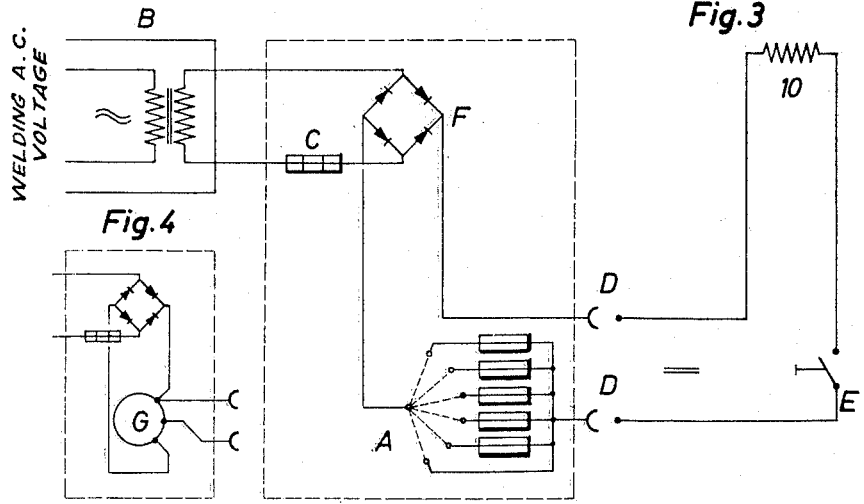
INVENTOR:
HANS BURMEISTER

United States Patent Office 3,153,135
Patented Oct. 13, 1964

3,153,135
PROTECTIVE EYE-SHIELD WITH AN AUTOMATI-
CALLY CONTROLLED VISOR SLIT
Hans Burmeister, Scharoldstrasse 2, Wuerzburg, Germany
Filed Nov. 30, 1961, Ser. No. 155,940
Claims priority, application Germany, Dec. 5, 1960,
B 60,358; July 12, 1961, B 63,233
9 Claims. (Cl. 219—147)

This invention relates to arc welding and, more particularly, to means for protecting the eyes of the welder. It is well known that because of the extreme concentrated brilliancy of the electric arc formed during welding, eye-shield means are necessary. In the prior art such means may take the form of goggles provided with heavy cobalt glass lenses. Alternatively such eyeshield may comprise a helmet provided with a harness to fit the head of the welder and having a viewing opening therein. A frame having a pane of cobalt glass is hinged so that it may be pivoted from a position closing the viewing opening, to an upward position out of the line of vision through the opening. Or the entire helmet may be manually pivoted on the harness and thus moved upwardly to a position out of the field of view. In such devices the eyeshield must be moved to shielding position before welding is started, that is, before an arc is struck. Means are also know to pivot the eyeshield automatically in response to closing of the welding circuit.

Such prior art devices are unsatisfactory and dangerous because they depend to a certain extent upon the volition of the welder and, when automatic, may be inadvertently or accidentally moved to non-obscuring position, as by shorting or opening of the welding circuit.

The primary object of the present invention is to provide a protective eyeshield with a shutter which is normally positioned over the field of view of the wearer and which is moved to open or non-obscuring position by an electromagnet under control of the welder at such times only as the welding circuit is under no-load conditions, that is, when no welding is being done.

Another object is to provide a protective eyeshield of the type described which makes it impossible for the shutter to be moved to non-obscuring position, inadvertently by the welder, or accidentally as by sorting or opening of the welding circuit.

Still another object is to provide a switch under control of the welder, which in turn, controls energization of the electromagnet effecting movement of the shutter to non-obscuring position, but which will be ineffective at all times when actual welding is being done.

Yet another object is to provide a protective eyeshield of the type mentioned, which has a high degree of versatility in adjustment to a wide range of welding loads and which is rapid and certain of operation.

Another object is to provide a relatively simple device which makes it unnecessary to move the shutter to light-obscuring position before starting of welding and which enables the welder to prepare for welding with unobscured vision, while at the same time protecting him from inadvertent or improper manipulation of his control switch.

A further object is to provide a protective device of the kind described which makes it impossible to move the shutter to non-obscuring position while the arc burns, even should the welder attempt to do so, while giving him full control of the shutter at all times when the arc is fully extinguished.

Yet another object is to provide a protective eyeshield which is reliable in operation, assures positive protection to the welder's eyes at all times and under all conditions of use, and which is a general advance in the art.

Other objects and advantages of the invention will be obvious to those skilled in the art after a study of the following detailed description, in connection with the accompanying drawing.

In the drawing:

FIGURE 1 is an elevation, partly in section, of a portion of a welder's helmet equipped with the invention;

FIGURE 2 is a detail view, also partly in section, and taken in a plane identified by line 2—2, FIGURE 1;

FIGURE 3 is a wiring diagram showing the electrical connections between the welding circuit, and the electromagnet and welder's hand switch by which the position of the eyeshield shutter is controlled;

FIGURE 4 is a diagram showing a modified form of electrical control and adjustment for the electromagnet; and FIGURE 5 illustrates schematically an alternative form of pivoted eyeshield.

Referring in detail to the drawing, 2 identifies a portion of the front of a welder's helmet having an opening 1 therein and which is before the welder's eyes when the helmet is being worn and through which he has direct vision when the shutter to be described is in non-obscuring position. As shown upon FIGURE 1, a rectangular frame 9 is fixedly mounted within opening 1. The upper portions of the end edges of this frame are formed with inward projections or stops 8 which are engaged by the shutter when in the fully closed position thereof. The shutter assembly comprises a rim 3 mounting a pane of glass 5 of cobalt or other light-absorbing heavy glass. The ends of the rim have aligned pintles 6 and 7 which mount the assembly to frame 9 for pivoting about a longitudinal axis centrally of the rim and substantially in the plane thereof. If desired the axis determined by the pintles may be offset upwardly from the central line of the shutter, so as to be nearer the upper edge of the frame than to the lower edge thereof. By such a construction that portion of the shutter moving within the helmet has a shorter dimension than the portion which moves outwardly.

Pintle 6 has its outer end journaled in a bearing in frame 9. As will be noted from FIGURES 1 and 2, pintle 7 is likewise journaled in a bearing in frame 9 but is also provided with an extension in the form of a bent lever by which the shutter assembly may be pivoted between its open and closed positions. For this purpose pintle 7 extends first axially outwardly, then horizontally forwardly to a bend 18, FIGURE 2, thence outwardly and downwardly at an angle of about 45°, to a second bend 13, then again forwardly to terminate in an enlarged end. By this construction, movement of the outer end in the vertical direction effects a corresponding pivoting of the shutter assembly between open and closed positions, about the common axis of pivots 6 and 7. A spring 15 has one end connected to pintle 7 and its other end connected through a swivel coupling 16, to the upper end of a vertical adjusting screw 17 threaded through a lug fixed with the helmet. This construction enables an accurate balance of the shutter for all positions about its axis.

The free or cranked end of pintle 7 passes freely through a short vertical slot in an extension member 12 which, in turn, is fixed with the armature 11 of an electromagnet 10. A rod 20 has a head 21 at its upper end and is fixed with electromagnet 10 so that on effective energization of the latter, armature 11 moves upwardly therealong. A coil spring 19 surrounds the rod and bears at its upper and lower ends against head 21 and armature 11, respectively, to thereby urge the armature 11 downwardly into the position shown upon FIGURE 1 wherein the shutter is fully closed, that is, in light-obstructing position. Of course, the weight of the armature itself aids in moving the shutter to the closed position and may be sufficient for such purpose without spring 19. The rod extends upwardly beyond head 21 where it is provided with a threaded end passing through a threaded opening in a cap piece of the electromagnet casing. A knob 23 fixed to the rod exteriorly of the electromagnet provides for a fine adjustment of the thrust exerted by the spring upon armature 11. Current lead-in wires to the electromagnet extend through conduit 22.

The arrangement and construction are such that when the electromagnet 10 is energized, armature 11 is drawn upwardly against the thrust of spring 19, pivot 7 is turned by the lever or crank forming an integral part thereof, and the shutter assembly 3, 4, 5, is pivoted into a position parallel with the line of sight through opening 1, thus affording a substantially unobstructed view through the opening. In other words the shutter assembly is moved to non-obstructing position. At all other times the shutter assembly is closed or in light-obstructing position, in response to the weight of armature 11 and the thrust of spring 19, and effectively protects the eyes of the welder from excessive intensity of light from the electric arc.

FIGURE 3 shows the wiring circuitry for the solenoid of the electromagnet. A step-down transformer B has its primary connected with the welding A.C. voltage and its secondary connected through a fuse C, with a full-wave rectifier F of known construction. The D.C. output of the rectifier has one lead directly connected with the terminal of a plug-in receptacle D. The other D.C. output lead is connected with the remaining terminal of the receptacle through a variable resistor A which can be adjusted for the various loads encountered in welding.

The plug of receptacle D has its terminals connected to a branch circuit which, as shown upon FIGURE 3, connects the electromagnet 10 and a manually actuable switch E, in series. Switch E is positioned for convenient operation by the welder. For example it may be attached to one welding glove or mounted on the handle of the welding electrode. Other suitable and convenient locations may be selected as desired or found more practicable.

In operation, when connection is made at D and switch E is open, electromagnet 10 is de-energized and the weight of armature 11, assisted by the thrust of spring 19, acts to hold the shutter assembly closed, that is, in a position wherein it obscures or greatly reduces the ambient light passing through opening 1. The connections and adjustments are so made that, with switch E closed and no welding current being drawn from the circuit which includes the primary of transformer B, the voltage applied to electromagnet 10 is substantially a maximum and is sufficient to create an excitation thereof overcoming the weight of the armature and the thrust of spring 19 with the result that the armature 11 is drawn upwardly and the eyeshield assembly is pivoted to open position in the direction indicated by the arrow upon FIGURE 2. When the parts have been thus moved, the shutter is in non-obstructing position and the welder has a clear and direct view through the opening in his helmet and is able to prepare for welding without handicap.

Upon initiation of welding, as by touching the welding rod to the work, to strike an arc, there is an immediate drop in voltage at the terminals of the secondary of the transformer and a corresponding drop in D.C. voltage applied to the electromagnet 10. The adjustment of variable resistor A and the tension of spring 19 have been previously so made that under the load conditions involved in actual welding, the pull exerted by electromagnet 10 upon its armature 11 is insufficient to overcome the combined weight of armature 11 and thrust of spring 19 so that their combined action effects an instantaneous closure of the shutter to thus reduce to a safe value the light coming from the welding arc.

In prior art constructions wherein a light-obscuring means is operated to closed position directly in response to closure of the welding circuit, while being spring-urged to open position, it frequently happened that, particularly when working in cramped quarters or under conditions requiring excessive movements, the welder would inadvertently effect a short circuit of the arc, a fuse would blow, or current otherwise be momentarily interrupted. The result would be that the shutter would open while the arc was still glowing and an excessive amount of light was emanating from the work. As a result the welder would suffer damage to his eyes.

My invention eliminates this danger because the shutter is constantly urged to closed or light-obstructing position so that momentary and unintentional opening of the circuit cannot result in opening of the shutter and consequent injury to the eyes of the welder. Nevertheless, with switch E conveniently available the welder is able to open the shutter as desired, but only at such times as no welding current is being drawn.

FIGURE 4 shows a modification wherein a potentiometer G is substituted for resistor A of FIGURE 3. The purpose in each case is the same, namely, to adjust the thrust of the electromagnet 10, when energized, for any given load on the circuit, and relatively to the opposing weight of armature 11 and the thrust of spring 19, so that the latter thrust predominates and maintains the shutter closed.

FIGURE 5 shows a modification wherein the upper half 25 of the frame of the helmet is offset rearwardly with respect to the lower half 26. The shutter assembly, generally identified at 24, pivots on a normally horizontal axis 27 from the substantially open position shown, counterclockwise to a closed position parallel with the planes of halves 25 and 26. These halves may include clear glass panels or panes, or wire netting.

Thus I have provided an eyeshield protective device which effects all the objects of the invention previously stated. The welder plugs in the helmet, closes switch E to open the shutter, dons the helmet while the shutter remains open so that he has unrestricted vision through the opening in the helmet and can prepare for work without hindrance. When he strikes an arc to begin welding the shutter immediately closes whether or not he has previously opened switch E. Normally this switch would be opened during welding. But even if this is not done the shutter cannot reopen until the load on the welding circuit has ceased, that is, until the arc has been extinguished. It is also contemplated, if desired, that delay means such as an air or liquid dash-pot device may be incorporated into the electromagnet so that the shutter opening is delayed for a few seconds after the arc has been extinguished and the excitation of electromagnet 10 has increased to the value necessary for opening the shutter when switch E is closed.

In the claims, the terms "normally horizontally," "normally vertical," etc., refer to the positions of the parts as they appear upon the drawing and are not to be taken as limiting use of the device to any particular position. The term "glass" includes all transparent or translucent materials capable of use in obstructing or reducing to a safe value the light emanating from an electric arc.

Numerous modifications, alterations and substitutions will occur to those skilled in the art after a study of the foregoing disclosure. Hence the disclosure should be taken in an illustrative rather than a limiting sense; and it is my desire and intention to reserve all changes within the scope of the sub-joined claims.

Having fully disclosed the invention, what I claim and desire to secure by Letters Patent is:

1. In a protective eyeshield system for welding, a support adapted for wear upon the head, a shutter of translucent glass mounted upon said support for guided movement between a first position obscuring the ambient light passing to the eyes of a wearer, and a second non-obscuring position, force-exerting means connected with said shutter and urging the same into said first position, an electromagnet carried by said support and including a movable armature, a connection moving said shutter as aforesaid, by and in response to movement of said armature, a rectifier, a first circuit including the output terminals of said rectifier and the solenoid of said electromagnet, in series, a welding circuit, and connections supplying the input to said rectifier from said welding circuit, energization of said solenoid urging said shutter to said second position against the urge of said force-exerting means, said force-exerting means including the weight of said armature.

2. The system of claim 1, said first circuit including a variable resistor in series with said solenoid.

3. The system of claim 1, said first circuit including a potentiometer therein.

4. In an eyeshield protective device for welders, a support for wear upon the head, a shutter mounted on said support for movement from a first position obscuring the ambient light seen by the wearer, to a second non-obscuring position, force-exerting means yielding urging said shutter to said first position, electromagnet means carried by said support and connected with said shutter to urge the same to said second position when energized, a hand switch, a first circuit including said hand switch and electromagnet means, in series, a transformer, a welding circuit including the primary of said transformer, and means including the secondary of said transformer supplying current to said first circuit from said welding circuit, and means in said first circuit to regulate the current supplied to said first circuit to an amount sufficient to operate said electromagnet means and move said shutter to said second position, only when full line voltage is available from said welding circuit.

5. In an eye-protective device for welders, a helmet for wear upon the head and having a rectangular viewing opening therein, a rectangular pane of light-obscuring glass, means mounting said pane to said helmet for pivoting about a central horizontal axis of said pane, from a first position covering said opening, to a second position substantially parallel with the wearer's line of sight through said opening, an electromagnet mounted in vertical position on said helmet at one side of said opening and including a vertically movable armature operable to descend of its own weight to a lower limiting position when the solenoid of said electromagnet is de-energized, a crank fixed with said pane and having its free end connected with said armature, said pane being in said first postion when said armature is in its lower limiting position, and a spring urging said armature into said lowermost position, energization of said electromagnet urging said armature upwardly against the weight thereof and the urge of said spring, to move said pane to said second position.

6. In a welder's protective eyeshield, a support adapted for wear upon the head, a shutter mounted upon said support for movement from a first position obscuring ambient light passing to the eyes of a wearer, to a second non-obscuring position, force means connected with said shutter and yielding urging the same into said first position, and electromagnetic means connected with said shutter and, when energized, urging said shutter into said second position, against the urge of said force means, said electromagnetic means being carried by said support with its axis normally vertical, said force means comprising the armature of said electromagnetic means, the lowermost position of said armature corresponding to said first position of said shutter.

7. An eyeshield as in claim 6, said force means also comprising a spring urging said armature into said lowermost position, so that the action of gravity on said armature and the force exerted by said spring, are cumulative, and means operable to adjust the force exerted by said spring upon said armature.

8. An eye-protective device for welders, comprising, a support for wear upon the head, a shutter mounted upon the support for movement on and relatively to said support, from a first position interposed in and obscuring the field of view of the wearer, to a second non-obscuring position, an electromagnet fixed with said support and including a solenoid with normally vertical axis and an armature translatable along said axis, an operating connection between said armature and said shutter, the construction and arrangement being such that the weight of said armature acts to urge said shutter to said first position when said solenoid is de-energized, energization of said solenoid raising said armature to correspondingly move said shutter to said second position, a rectifier, a variable rheostat, a first circuit including the output of said rectifier, said rheostat and said solenoid, in series, a transformer, a second circuit including the secondary of said transformer and the input of said rectifier, in series, and a welding circuit including a source of A.C., and the primary of said transformer, in series.

9. The device of claim 8, said electromagnet including an abutment, a compression spring acting between said abutment and said armature to urge the latter downwardly and said shutter into said first position, and manually operable means connected with said abutment to move the same relatively to said support to thereby adjust the force of said spring effective upon said armature.

References Cited in the file of this patent

UNITED STATES PATENTS

| 1,822,308 | Norton | Sept. 8, 1931 |
| 2,036,224 | Lincoln et al. | Apr. 7, 1936 |
| 2,058,169 | Montague | Oct. 20, 1936 |
| 2,171,052 | Tatter | Aug. 29, 1939 |
| 2,548,230 | Molyneux | Apr. 10, 1951 |

FOREIGN PATENTS

| 514,053 | Italy | Feb. 8, 1955 |
| 990,219 | France | June 6, 1951 |